US012692732B2

(12) United States Patent
Fuchs

(10) Patent No.: US 12,692,732 B2
(45) Date of Patent: Jul. 28, 2026

(54) MOTOR VEHICLE LOCK, IN PARTICULAR MOTOR VEHICLE DOOR LOCK

(71) Applicant: KIEKERT AKTIENGESELLSCHAFT, Heiligenhaus (DE)

(72) Inventor: Carsten Fuchs, Essen (DE)

(73) Assignee: KIEKERT AKTIENGESELLSCHAFT, Heiligenhaus (DE)

( * ) Notice: Subject to any disclaimer, the term of this patent is extended or adjusted under 35 U.S.C. 154(b) by 53 days.

(21) Appl. No.: 18/700,491

(22) PCT Filed: Oct. 11, 2022

(86) PCT No.: PCT/DE2022/100752
§ 371 (c)(1),
(2) Date: Apr. 11, 2024

(87) PCT Pub. No.: WO2023/061534
PCT Pub. Date: Apr. 20, 2023

(65) Prior Publication Data
US 2024/0410203 A1 Dec. 12, 2024

(30) Foreign Application Priority Data
Oct. 14, 2021 (DE) ..................... 10 2021 126 641.6

(51) Int. Cl.
*E05B 81/16* (2014.01)
*E05B 81/06* (2014.01)
*E05B 81/90* (2014.01)

(52) U.S. Cl.
CPC ............. *E05B 81/16* (2013.01); *E05B 81/06* (2013.01); *E05B 81/90* (2013.01)

(58) Field of Classification Search
CPC .......... E05B 81/46; E05B 81/90; E05B 77/22; E05B 77/24; E05B 77/26; E05B 77/30
See application file for complete search history.

(56) References Cited

U.S. PATENT DOCUMENTS 5,454,608 A * 10/1995 Dzurko .................. E05B 81/16 292/216
6,123,371 A * 9/2000 Fisher ..................... E05B 81/16 292/201
(Continued)

FOREIGN PATENT DOCUMENTS

DE 10217972 A1 11/2003
DE 102017124521 A1 * 4/2019 ............ E05B 81/14
(Continued)

OTHER PUBLICATIONS

"Pulley." Merriam-Webster.com Dictionary, Merriam-Webster, https://www.merriam-webster.com/dictionary/pulley. Accessed Aug. 7, 2025 (Year: 2025).*
(Continued)

*Primary Examiner* — Kristina R Fulton
*Assistant Examiner* — Emily G. Brown
(74) *Attorney, Agent, or Firm* — Renner, Otto, Boisselle & Sklar, LLP

(57) ABSTRACT

A motor vehicle lock, in particular a motor vehicle door lock, which is equipped with a locking mechanism made substantially of a rotary latch and a pawl. Furthermore, an electromotive drive and an actuating lever mechanism with at least one release lever and a control lever are implemented. The drive can operate both on the release lever for opening the locking mechanism and the control lever. According to the invention, a force transmission element that cooperates with the release lever is provided for emergency opening of the locking mechanism.

11 Claims, 5 Drawing Sheets

(56) References Cited

U.S. PATENT DOCUMENTS

| | | | | |
|---|---|---|---|---|
| 6,520,549 | B1 * | 2/2003 | Kalsi | E05B 85/243 292/201 |
| 8,840,154 | B2 * | 9/2014 | Wilms | E05B 81/16 292/216 |
| 11,280,121 | B2 * | 3/2022 | Sardelli | E05B 15/004 |
| 2003/0116977 | A1 * | 6/2003 | Erices | E05B 81/14 292/201 |
| 2008/0224482 | A1 | 9/2008 | Cumbo | |
| 2018/0066457 | A1 | 3/2018 | Erices | |
| 2018/0355643 | A1 * | 12/2018 | Taurasi | E05B 81/16 |
| 2020/0102771 | A1 * | 4/2020 | Ney | E05B 77/30 |
| 2021/0237804 | A1 * | 8/2021 | Gillis | E05B 83/26 |
| 2022/0282530 | A1 * | 9/2022 | Leonardi | E05B 81/06 |

FOREIGN PATENT DOCUMENTS

| | | | | |
|---|---|---|---|---|
| DE | 102019126596 | A1 | 4/2021 | |
| DE | 102019133654 | A1 * | 6/2021 | E05B 81/42 |
| EP | 1320652 | A1 | 6/2003 | |
| GB | 2304796 | A * | 3/1997 | E05B 77/28 |
| WO | 2015113545 | A1 | 8/2015 | |

OTHER PUBLICATIONS

International Search Report mailed Jan. 2, 2023, for priority International Application No. PCT/DE2022/100752.

* cited by examiner

MOTOR VEHICLE LOCK, IN PARTICULAR MOTOR VEHICLE DOOR LOCK

This application is a national phase of International Patent Application No. PCT/DE2022/100752 filed Oct. 11, 2022, which claims priority to German Patent Application No. 10 2021 126 641.6 filed Oct. 14, 2021, each of which is hereby incorporated herein by reference in its entirety.

FIELD OF DISCLOSURE

The invention relates to a motor vehicle lock, in particular a motor vehicle door lock, with a locking mechanism consisting substantially of a rotary latch and a pawl, further with an electromotive drive, and with an actuating lever mechanism with at least one release lever and control lever, wherein the drive can operate both on the release lever for opening the locking mechanism and on the control lever.

BACKGROUND OF DISCLOSURE

The electromotive drives used in this context generally serve to increase comfort. This is because they are generally used to lift the pawl from its latching engagement with the rotary latch when the locking mechanism is closed, so that a previously trapped locking bolt is released. As a result, a motor vehicle door equipped with the motor vehicle lock in question can then be opened. The control lever is usually a component of a locking unit. With its help, the locking unit can therefore generally be transferred to its basic functional positions “unlocked” and “locked”. This is particularly necessary if an operating lever is also provided, for example to ensure emergency opening of the locking mechanism if the electromotive drive fails.

The prior art according to DE 10 2019 126 596 A1 already describes the possibility of the electromotive drive operating on the locking mechanism for opening in one opening direction and additionally realizing an unlocking direction that deviates from this. In this unlocking direction, a safety lever or control lever is biased to assume an unlocking position or unlocking position. In addition, a stop is provided for the electromotive drive, which limits the movement of the electromotive drive at least when it is actuated in the opening direction to cancel the unlocked position. This prevents the locking mechanism from opening. This provides a solution with a simple design.

The above-described prior art, which in this respect forms the genre, has basically proven itself, but still offers space for further development. Thus, the well-known teaching works with a relatively complex construction. In addition, a mechanical lever mechanism is required at this location in order to be able to open the locking mechanism in an emergency. This results in a construction that is not only complicated, but also expansive and cost-intensive. The invention aims to remedy this situation.

SUMMARY OF DISCLOSURE

The invention is based on the technical problem of further developing a motor vehicle lock and particularly a motor vehicle door lock in such a manner that the design effort is significantly reduced compared to previous procedures.

To solve this technical problem, the invention proposes that a force transmission element interacting with the release lever is provided for emergency opening of the locking mechanism in the motor vehicle lock of the type.

According to the invention, the locking mechanism is therefore still biased by the electromotive drive, even during an emergency opening process. However, in this context, the invention provides for a force transmission element interacting with the release lever. This force transmission element is an element that is used to transmit or reduce the rotary movement typically exerted by the electromotive drive on the locking mechanism, depending on the design. In any case, the power transmission element ultimately ensures that the electromotive drive can be used to open the locking mechanism, particularly if, for example, an electromotive opening drive does not normally work or is not in a position to open the locking mechanism due to a drop in on-board power supply voltage.

In the simplest case, this can be realized and converted in such a manner that the force transmission element is designed as an additional lever acting on the release lever and working during emergency opening. This lever is therefore only biased by the electromotive drive during an emergency opening process, which means that, in accordance with the invention, the electromotive drive is layered in such a manner that it can open the locking mechanism even if, for example, the on-board power supply voltage is extremely low (less than 5 V). For this purpose, the release lever, including an additional lever or force transmission element, usually works on the pawl and lifts it from its latching engagement with the rotary latch in the locked state.

In an advantageous embodiment, the overall design is still such that the control lever assumes its “locked” position throughout. This means that the motor vehicle lock assumes its “locked” position throughout, both during an opening process in normal operation using the electromotive drive and when the locking mechanism is opened in an emergency. As a result, selective locking/unlocking operations are not required and do not need to be represented within the scope of the invention.

In addition, this makes an external actuating lever, which is consistently realized in the prior art, dispensable. This is because the electromotive drive is able to open the locking mechanism even when the on-board power supply voltage drops. In this context, the adoption of the “locked” location by the control lever and thus a locking unit consistently ensures that a motor vehicle door equipped with the relevant motor vehicle lock cannot be opened unintentionally.

In this context, it is of course possible to equip the motor vehicle lock according to the invention, and in particular the motor vehicle door lock, with an operating lever or internal operating lever. The relevant motor vehicle lock can still be opened (manually) using this inside operating lever or an inside door handle (and/or outside door handle), which is usually provided at the end.

Since the control lever assumes its “locked” position throughout according to an advantageous embodiment and consequently the motor vehicle lock also remains in this position, even when the vehicle electrical system voltage has dropped, an additional anti-theft device or anti-theft unit is not required. This is because the absence of an external operating lever means that a motor vehicle door fitted with the motor vehicle lock can only be opened from the outside using the electromotive drive anyway. If opening from the inside is desired, the motor vehicle lock or the control lever must first be moved to its “unlocked” position. This can usually be done electronically, for example by transferring a locking element or the locking unit assigned to the interior operating lever or interior door handle to the unlocked state. However, it is also possible in principle to use the inside door handle to first unlock the door during the first stroke and then open the locking mechanism during the second stroke. These are the main advantages.

In a further advantageous embodiment, the control lever is generally bistable. In fact, the control lever can particularly assume the positions “locking”, “unlocking” and “emergency opening” if an operating lever is also realized. In general, however, the control lever can only be used to realize the two functional positions “locking” and “emergency opening”.

The force transmission element generally dips into a control contour of the control lever. This control contour generally interacts with a control element as part of the electromotive drive. It has also proven to be a good idea if the power transmission element is fitted with a spring.

In this case, the spring usually ensures that the force transmission element is held against a stop edge of the control contour of the control lever in the spread state. In this manner, the force transmission element defines an “undercut” compared to the control contour, as will be explained in more detail with reference to the figure description. This ensures that the control lever remains in its “locked” position, particularly in the event of an emergency opening. For this purpose, the spring is usually equipped as a coil spring with a leg resting on the stop edge of the control contour and a leg resting on the force transmission element.

As already explained, the motor vehicle lock according to the invention can generally be realized and converted without an external actuating lever. In contrast, an internal operating lever or, more generally, a manually actuated operating lever is usually also provided as part of the operating lever mechanism. The operating lever or internal operating lever in question regularly has a clutch lever mounted on it for this purpose. The clutch lever is in turn biased by the control lever.

In this context, the control lever actually ensures that the clutch lever is “engaged” or “disengaged”. When the clutch lever is engaged, the motor vehicle lock is in the “unlocked” state. As a result, the manually actuated operating lever or internal operating lever can work on the release lever and manual opening of the locking mechanism (from the inside) is possible. If, on the other hand, the clutch lever is in the “disengaged” state, this corresponds to the “locked” state of the control lever.

The “unlocked” and “locked” functional positions are set by the electromotive drive, which can operate both on the release lever for opening the locking mechanism and on the said control lever. For this purpose, the drive is usually equipped with an output disk and the control element mentioned above. For its part, the control element ensures that the release lever is actuated on the one hand and the control lever on the other.

The result is a motor vehicle lock that is particularly simple in design and construction. In fact, the motor vehicle lock according to the invention can be opened in an emergency using the electromotive drive if the on-board power supply voltage to the drive has dropped. This is ensured by the force transmission element that interacts with the release lever for emergency opening of the locking mechanism. Furthermore, since the control lever and, with it, the motor vehicle lock as a whole are always in the “locked” position, an additional locking unit can be constructed particularly easily. In fact, it is possible to implement the anti-theft function in an exemplary manner using only control technology or electronic means. These are the main advantages.

BRIEF DESCRIPTION OF DRAWINGS

In the following, the invention is explained in more detail by means of an exemplary embodiment; the figures show.

DETAILED DESCRIPTION

Figure 1:
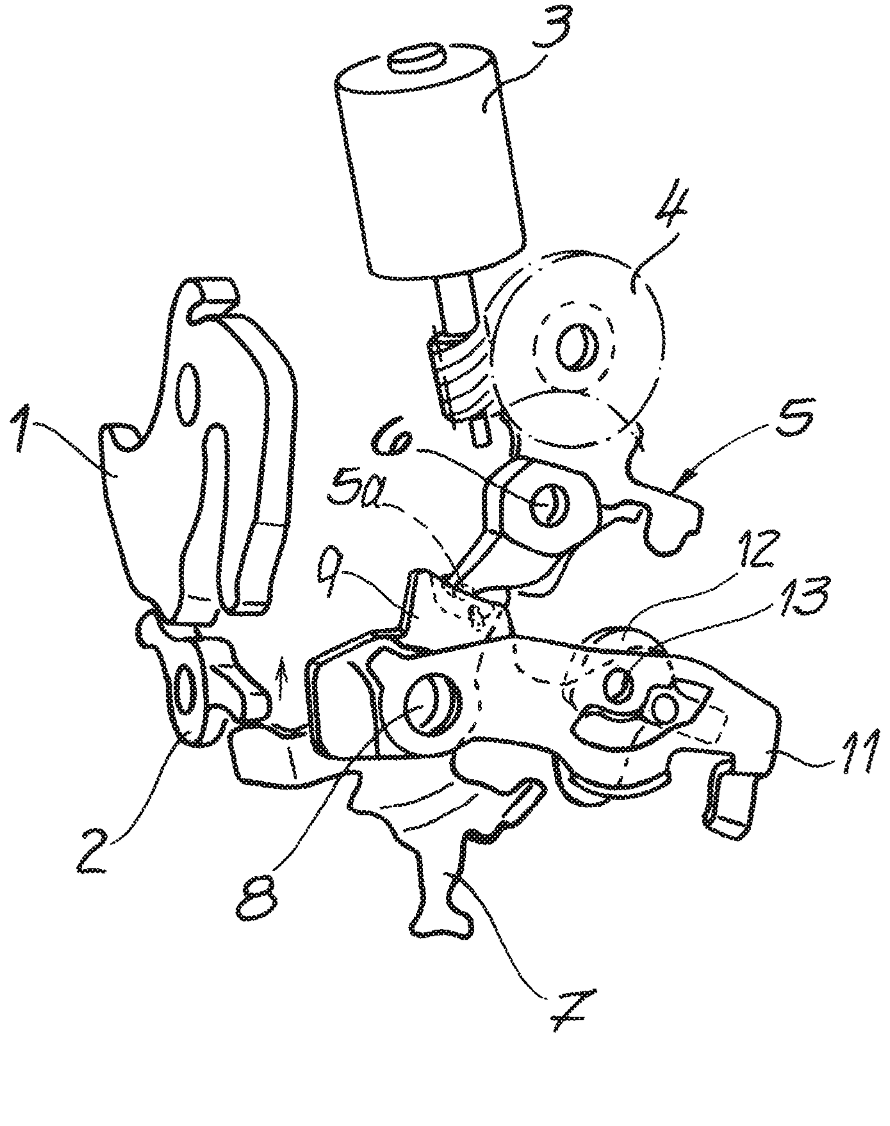
FIG. 1 shows a perspective view of the motor vehicle lock according to the invention.

The drawings show a motor vehicle latch which, according to the exemplary embodiment, is a motor vehicle door latch. For this purpose, the motor vehicle door lock is equipped with a locking mechanism 1, 2 consisting substantially of rotary latch 1 and pawl 2, which can best be understood from FIG. 1. In addition, the motor vehicle lock or motor vehicle door lock is equipped with an electromotive drive 3, 4, 5.

For this purpose, the electromotive drive 3, 4, 5 is equipped with an electric motor 3, which has a worm located on a drive shaft that meshes with an output disk 4. Rotary movements of the electric motor 3 cause the output disk 4 to move clockwise and counterclockwise around its axis. This allows the output disk 4 to work on a control element 5, which is pivotably mounted about its axis 6 in a lock housing not expressly shown. As a result of this, the control element 5, biased by the electromotive drive 3, 4, 5, can perform a counterclockwise movement, as can be seen by comparing FIGS. 2 and 3.

Figure 2:
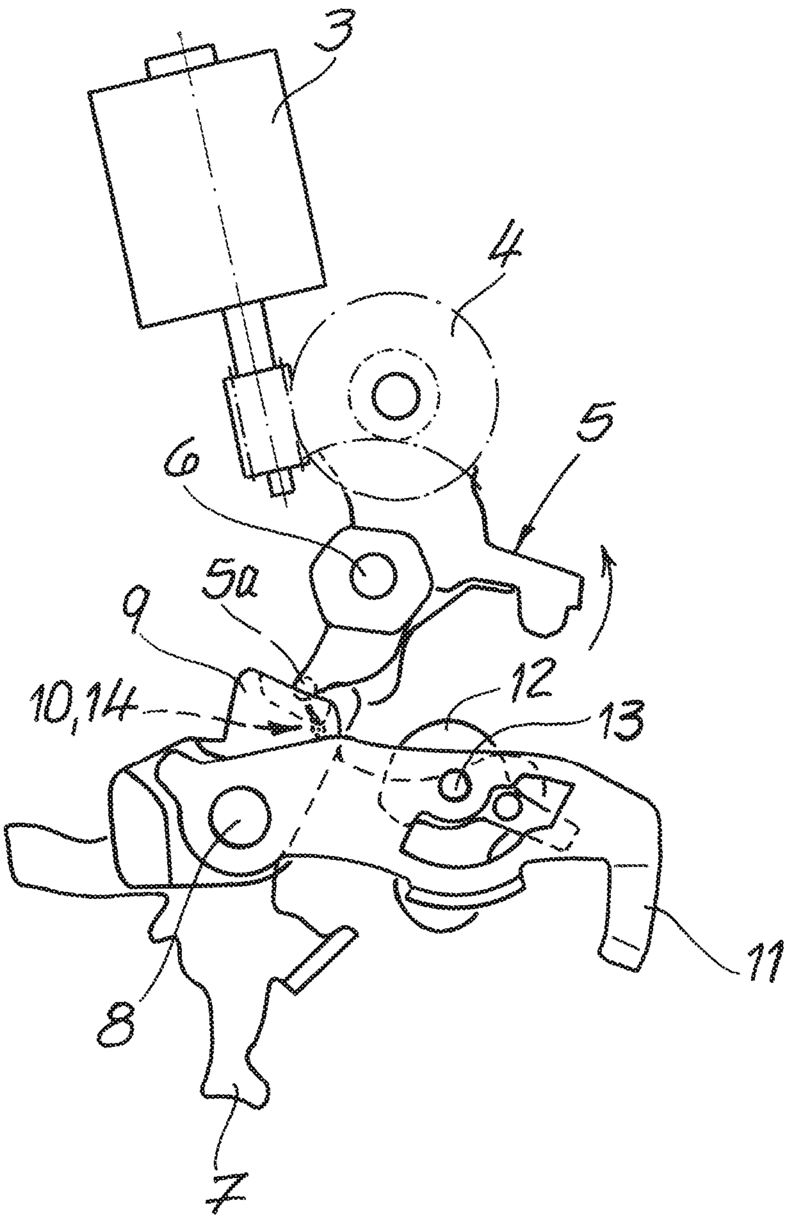
FIG. 2 shows the motor vehicle lock according to FIG. 1 in the locked state.
Figure 3:
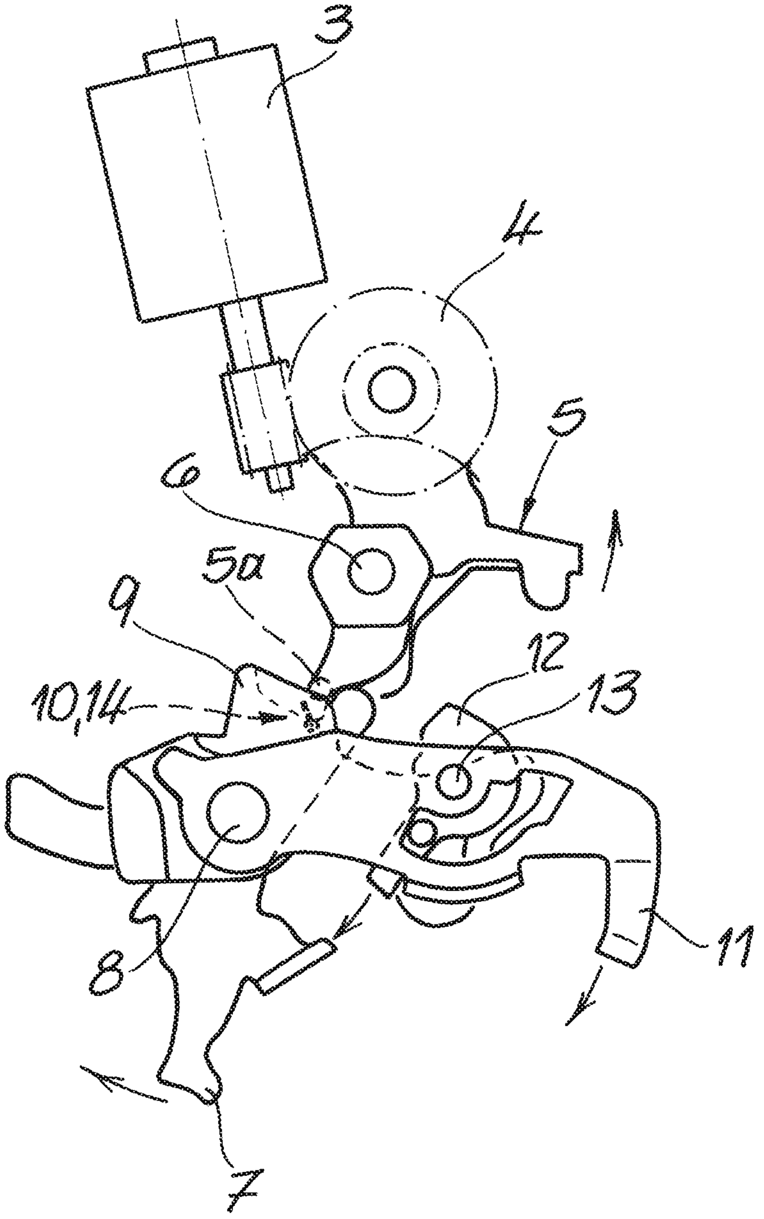
FIG. 3 shows the motor vehicle lock according to FIG. 2 during an electromotive opening process in normal operation.
Figure 4:
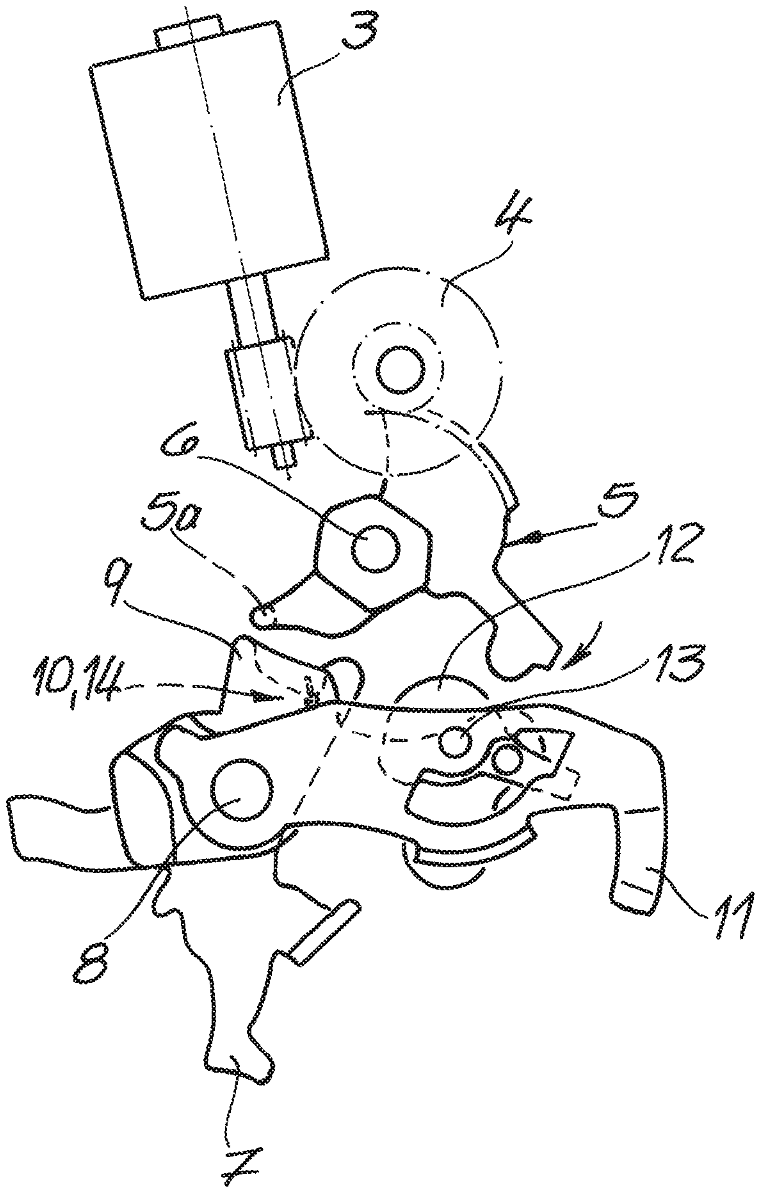
FIG. 4 shows the motor vehicle lock during an emergency opening procedure and FIG. 5A-C shows the emergency opening process in detail.

In fact, the counterclockwise movement of the control element 5 starting from the locked state shown in FIG. 2 corresponds to the fact that a release lever 7 can be biased with the aid of the control element 5 or a front-side control cam 5*a*. As a result of this actuating movement on the part of the control element 5 or its control cam 5*a*, the release lever 7 performs a clockwise movement around its axis 8 from the locked state shown in FIG. 2 to the open state as shown in the representation in FIG. 3.

Transmitted to FIG. 1, the clockwise movement of the release lever 7 about its axis 8 corresponds to the pawl 2 being pivoted “upwards” in the representation shown in FIG. 1, or counterclockwise in the side view of the locking mechanism 1, 2. As a result of this, the pawl 2 is lifted from its latching engagement with the rotary latch 1, such that a locking bolt not expressly shown and previously captured by the rotary latch 1 is then released and an associated motor vehicle door can be opened. This corresponds to normal operation during an opening process using the electromotive drive 3, 4, 5.

The electromotive drive 3, 4, 5 operates not only and generally on the release lever 7 to open the locking mechanism 1, 2. At the same time, the electromotive drive 3, 4, 5 can also operate on a control lever 9. For this purpose, the control lever 9 is equipped with a control contour 10, particularly shown enlarged in FIG. 5A-C. The control contour 10 has a substantially U-shaped design with a front stop edge 10*a* and a rear stop edge 10*b*. It can also be seen from the figures that the control lever 9 and the release lever 7 are mounted on the same axis in relation to the common axis 8.

Also mounted on the same axis as the relevant axis 8 is a manually actuated operating lever 11, which is basically dispensable according to the invention. According to the exemplary embodiment, the operating lever 11 is an internal operating lever 11. The internal actuating lever 11 has a clutch lever 12 mounted on it such that it can rotate. For this purpose, an axis 13 is defined on the operating lever or inner operating lever 11, about which the clutch lever 12 is mounted such that it can rotate relative to the operating lever or inner operating lever 11.

The clutch lever 12 can now be biased using the control lever 9. The clutch lever 12 can actually be moved into the engaged position shown in FIG. 3 with the aid of the control lever 9. The "unlocked" state of the control lever 9 corresponds to this. As the clutch lever 12 assumes its "engaged" position in this case, the release lever 7 can be biased manually and the locking mechanism 1, 2 opened as an alternative to the electromotive drive 3, 4, 5 via the operating lever 11 by means of a movement that is also only indicated in FIG. 3.

As a rule, however, the locking mechanism 1, 2 is opened by motor during normal operation, using the electromotive drive 3, 4, 5. During this passage, the control lever 9 assumes its "locked" position throughout. This means that the locking mechanism 1, 2 cannot be opened using the manually operated operating lever 11, for example. An additional anti-theft device is therefore unnecessary in this case.

Figure 5:
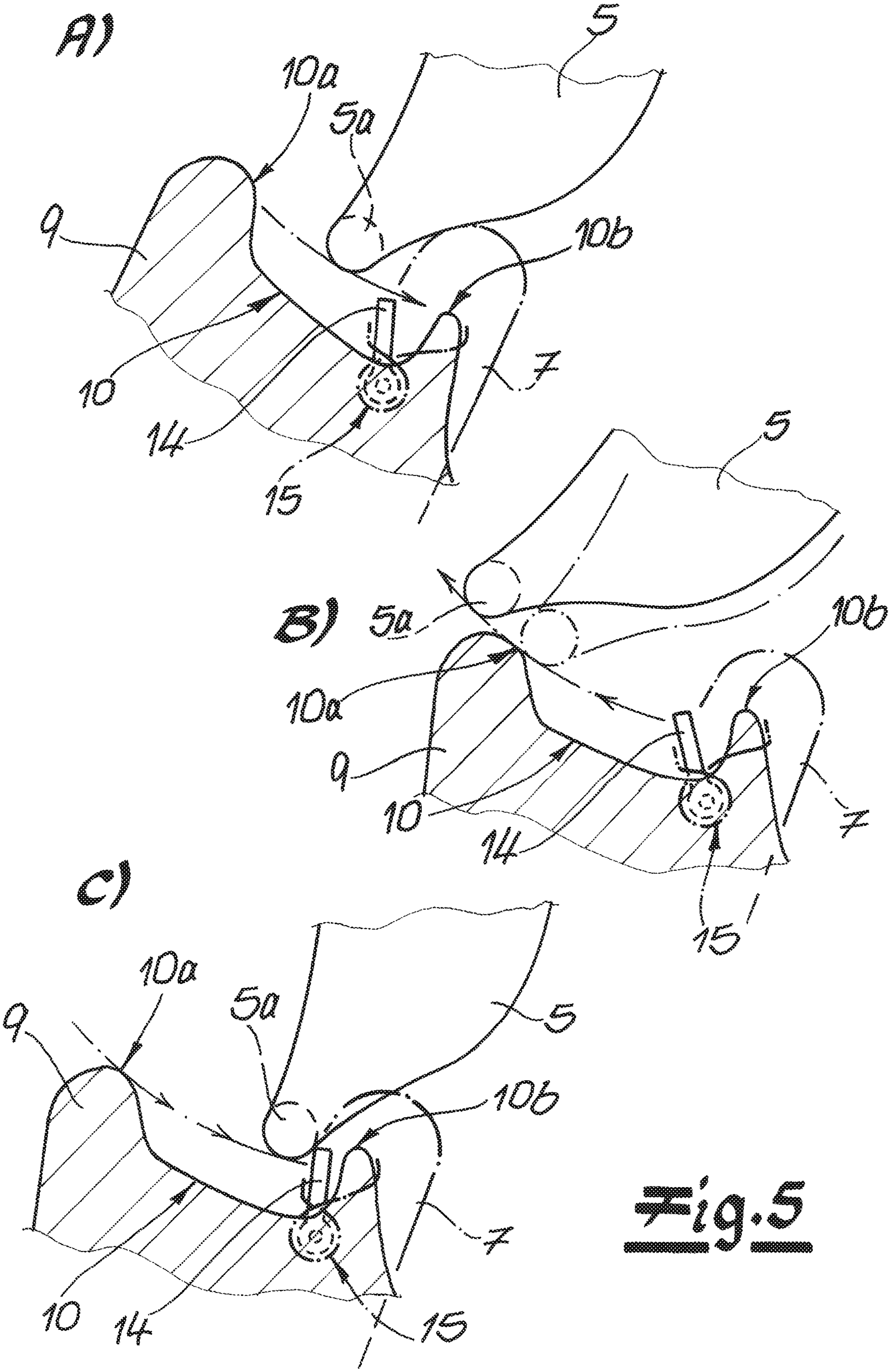

In accordance with the invention, a force transmission element 14 interacting with the release lever 7 is now realized for the emergency opening of the locking mechanism 1, 2, which can be understood in particular with reference to the representation in FIG. 5A-C. The force transmission element 14 protrudes into the control contour 10 on the control lever 9 and in this way defines a kind of "undercut" in the unstruck state, as represented in FIG. 5A-C.

In normal operation and with sufficient on-board power supply voltage of an associated motor vehicle, the electromotive drive 3, 4, 5 is energized in such a manner that, starting from the locked position of the locking mechanism 1, 2 in the representation according to FIG. 5A, it pivots the release lever 7 clockwise about its axis 8, so that the pawl 2 is thereby lifted from its latching engagement with the rotary latch 1. (see the transition from FIG. 2 to FIG. 3) If there is now a drop in the on-board power supply voltage, the locking mechanism 1, 2 is opened in an emergency in accordance with the invention, as before and unchanged with the aid of the electromotive drive 3, 4, 5.

For this purpose, the control lever 9 is designed to be bistable overall and is capable of assuming the "locked" and "emergency opening" or "unlocked" positions. The actual procedure for emergency opening is that the electromotive drive 3, 4, 5 biases the control element 5 or the end control cam 5*a* in such a way that it is moved clockwise from the "locked" home position as shown in FIG. 2. Consequently, the control cam 5*a* passes the front stop edge 10*a* of the control contour 10 of the control lever 9. This causes the control lever 9 to pivot counterclockwise so that the control cam 5*a* now drives against the force transmission element 14 during the backward movement (spring 15 is compressed).

It can be seen that the force transmission element 14 does not just dip into the control contour 10 of the control lever 9. Instead, the force transmission element 14 is additionally equipped with a spring 15. The spring 15 is a spiral spring, one leg of which is in contact with the force transmission element 14, whereas the other leg comes into annex with a deposit edge 10*b*, according to the exemplary embodiment the rear deposit edge 10*b* of the control contour 10.

In this way, the control cam 5*a* on the control element 5 can subsequently move against the force transmission element 14 during a counterclockwise movement starting from the "unlocked" position of the control element 5 merely indicated in FIG. 2 beyond the basic position shown as a solid line and act on it, see FIG. 5C. The force transmission element 14 is connected to the release lever 7 and, according to the exemplary embodiment, is designed as a lever or lever arm that can be coupled to the release lever 7. Depending on the design, this results in a transmission or reduction of the rotary movement of the control element 5 or its control cam 5*a* during emergency opening. This allows the electromotive drive 3, 4, 5 to operate via the extended lever arm according to the exemplary embodiment on the release lever 7 even in the event of a drop in the vehicle electrical system voltage, which again and as desired lifts the pawl 2 from its latching engagement with the rotary latch 1 even in the event of an emergency opening.

The operating lever or internal operating lever 11 realized at this location is held in its "locked" state throughout this process. This is because the control lever 9 does not bias the clutch lever 12 in such a manner that the clutch lever 12 is engaged. As a result, any actuation of the operating lever or internal operating lever 11 remains unchanged during the process described.

LIST OF REFERENCE NUMBERS

Locking mechanisms 1, 2
Rotary latch 1
Pawl 2
Drive 3, 4, 5
Electric motor 3
Output disk 4
Control element 5
Control cam 5*a*
Control element 6
Release lever 7
Axis 8
Control lever 9
Control contour 10
Stop edge 10*a*
Stop edge 10*b*
Operating lever 11
Internal operating lever 11
Clutch lever 12
Axis 13
Power transmission element 14
Spring 15

The invention claimed is:

1. A motor vehicle lock comprising:

a locking mechanism including a rotary latch and a pawl, an electromotive drive including a control element, and an actuating lever mechanism with at least a release lever and a control lever, wherein the control element directly operates on the release lever for opening the locking mechanism and on the control lever, wherein the locking mechanism is opened during a normal powered operation by operation of the electromotive drive causing the control element to operate directly on the release lever, and the control lever assumes a locked position during the normal operation, a manually actuatable operating lever, wherein the locking mechanism cannot be opened with the aid of the manually actuatable operating lever during the normal powered operation, a clutch lever, wherein with the aid of the control lever, the clutch lever is transferred into an engaged position corresponding to an unlocked state of the control lever in which a position of the release lever is manually biased and the locking mechanism is opened via the manually actuatable operating lever by movement as an alternative to the electromotive drive, and a force transmission element, wherein the locking mechanism is opened during an emergency powered opening by operation of the electromotive drive causing the control element to move the control lever to an emergency opening position such that the force transmission element is directly engageable by the control element, wherein the force transmission element cooperating with the release lever provides for the emergency powered opening of the locking mechanism, with the aid of which a rotary movement exerted by the electromotive drive on the locking mechanism is translated or reduced, wherein during normal powered operation, the control element is spaced from the force transmission element, wherein the force transmission element is a lever or a lever arm which is connected to the release lever, and wherein the force transmission element dips into a control contour of the control lever.

2. The motor vehicle lock according to claim 1, wherein the force transmission element is equipped with a spring.

3. The motor vehicle lock according to claim 2, wherein the spring holds the force transmission element in a spread-out state relative to a stop edge of the control contour.

4. The motor vehicle lock according to claim 3, wherein the spring is a spiral spring with a leg resting against the stop edge and against the force transmission element.

5. The motor vehicle lock according to claim 1, wherein the manually actuatable operating lever is provided as a component of the actuating lever mechanism.

6. The motor vehicle lock according to claim 5, wherein the manually actuatable operating lever is equipped with the clutch lever mounted thereon, which is biased by the control lever.

7. The motor vehicle lock according to claim 1, wherein the electromotive drive has an output disk that acts on the control element that operates the release lever.

8. The motor vehicle lock according to claim 1, wherein the emergency powered opening occurs when an on-board power supply voltage is below a threshold amount.

9. The motor vehicle lock according to claim 1, wherein the control lever is movable between the locked position, the emergency opening position, and an unlocked position.

10. A motor vehicle lock comprising:

a locking mechanism including a rotary latch and a pawl, an electromotive drive, and an actuating lever mechanism with at least a release lever and a control lever, wherein the electromotive drive operates on the release lever for opening the locking mechanism and on the control lever, wherein the locking mechanism is opened during a normal operation by operation of the electromotive drive, and the control lever continuously assumes a locked position during the normal operation, a manually actuatable operating lever, wherein the locking mechanism cannot be opened with the aid of the manually actuatable operating lever during the normal operation, a clutch lever, wherein with the aid of the control lever, the clutch lever is transferred into an engaged position corresponding to an unlocked state of the control lever in which a position of the release lever is manually biased and the locking mechanism is opened via the manually actuatable operating lever by movement as an alternative to the electromotive drive, and a force transmission element, wherein the force transmission element cooperating with the release lever provides for an emergency opening of the locking mechanism, with the aid of which a rotary movement exerted by the electromotive drive on the locking mechanism is translated or reduced, wherein the force transmission element is a lever or a lever arm which is connected to the release lever, wherein the force transmission element dips into a control contour of the control lever, wherein the force transmission element is equipped with a spring, wherein the spring holds the force transmission element in a spread-out state relative to a stop edge of the control contour, and wherein the spring is a spiral spring with a leg resting against the stop edge and against the force transmission element.

11. A motor vehicle lock comprising:

a locking mechanism including a rotary latch and a pawl, an electromotive drive, and an actuating lever mechanism with at least a release lever and a control lever, wherein the electromotive drive operates on the release lever for opening the locking mechanism and on the control lever, wherein the locking mechanism is opened during a normal operation by operation of the electromotive drive, and the control lever continuously assumes a locked position during the normal operation, a manually actuatable operating lever, wherein the locking mechanism cannot be opened with the aid of the manually actuatable operating lever during the normal operation, a clutch lever, wherein with the aid of the control lever, the clutch lever is transferred into an engaged position corresponding to an unlocked state of the control lever in which a position of the release lever is manually biased and the locking mechanism is opened via the manually actuatable operating lever by movement as an alternative to the electromotive drive, and a force transmission element, wherein the force transmission element cooperating with the release lever provides for an emergency opening of the locking mechanism, with the aid of which a rotary movement exerted by the electromotive drive on the locking mechanism is translated or reduced, wherein the force transmission element is a lever or a lever arm which is connected to the release lever, wherein the manually actuatable operating lever is provided as a component of the actuating lever mechanism, and wherein the manually actuatable operating lever is equipped with the clutch lever mounted thereon, which is biased by the control lever.

* * * * *